Nov. 8, 1960   S. KUBA ET AL   2,959,367
MODIFIED GRID WINDING LATHE
Filed Aug. 22, 1957   6 Sheets-Sheet 1
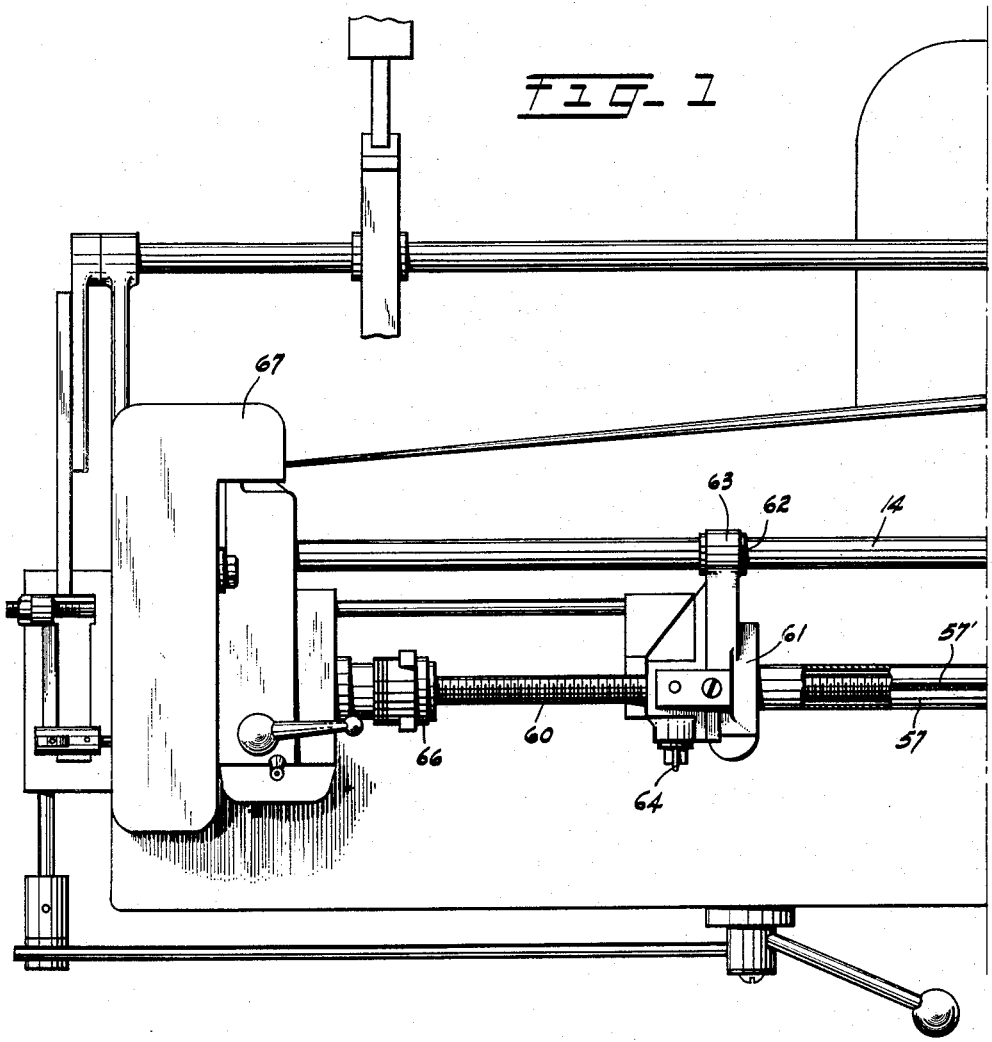
INVENTORS
S. KUBA
A. N. WIEGNER, JR
By W. W. Johnson
ATTORNEY

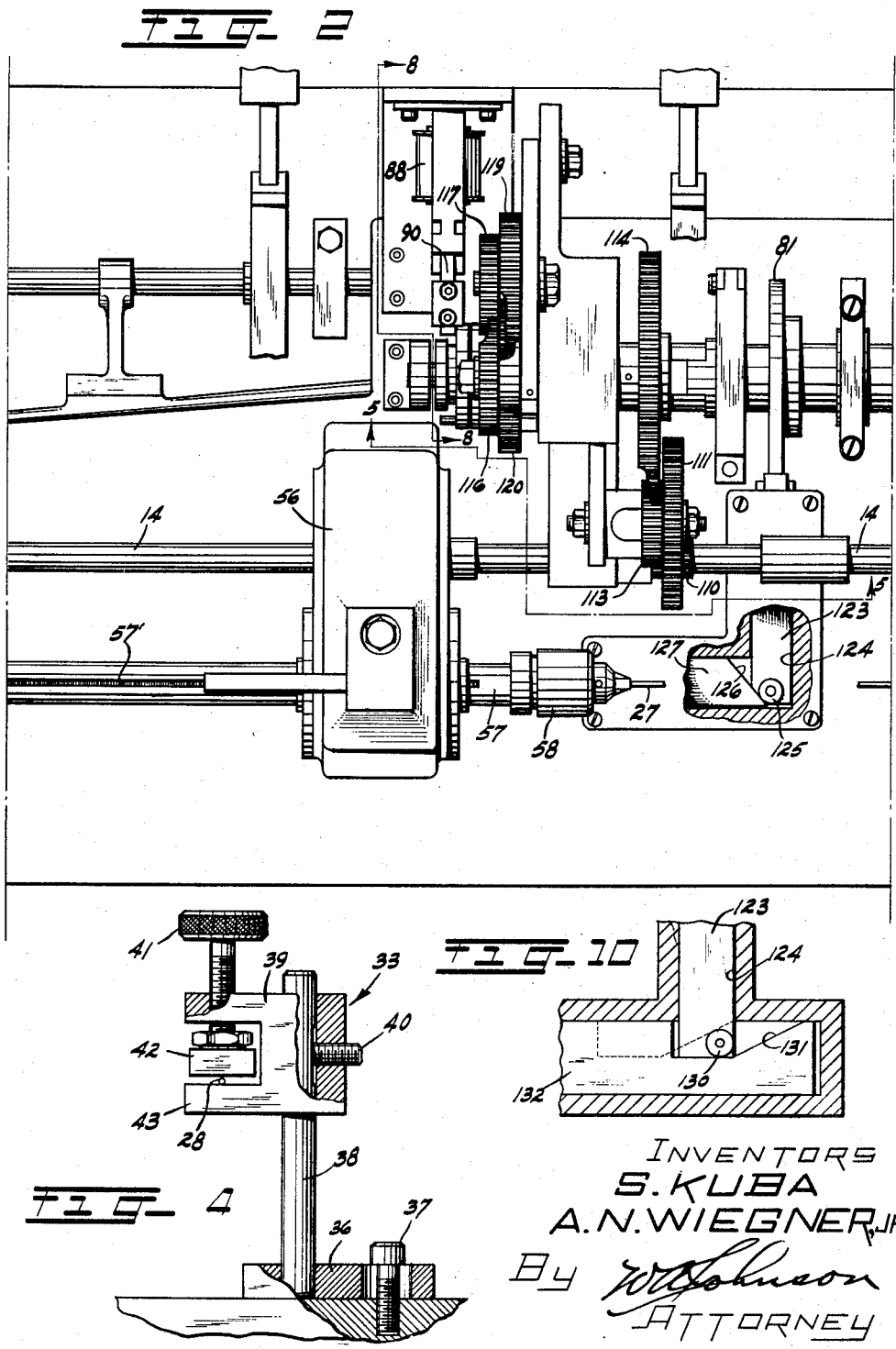

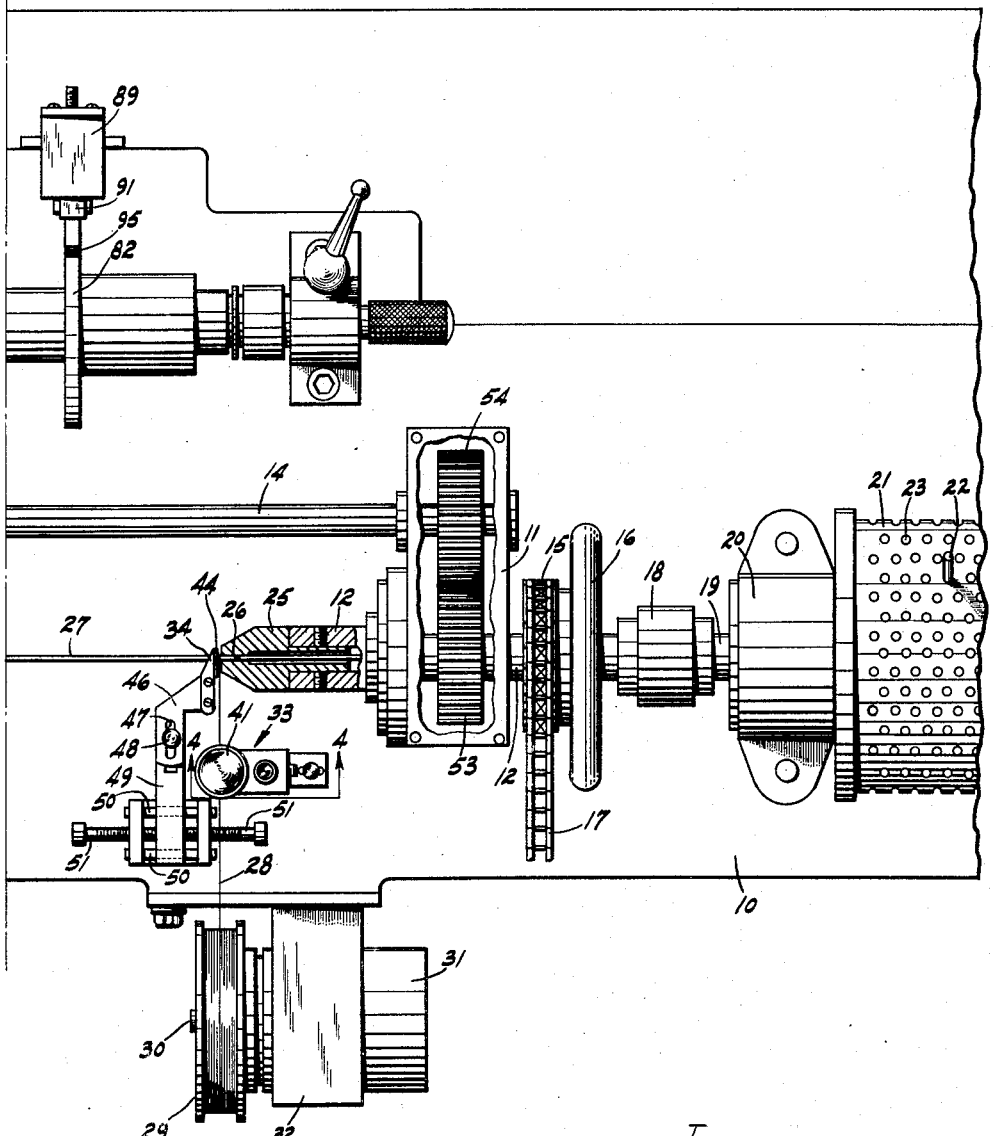

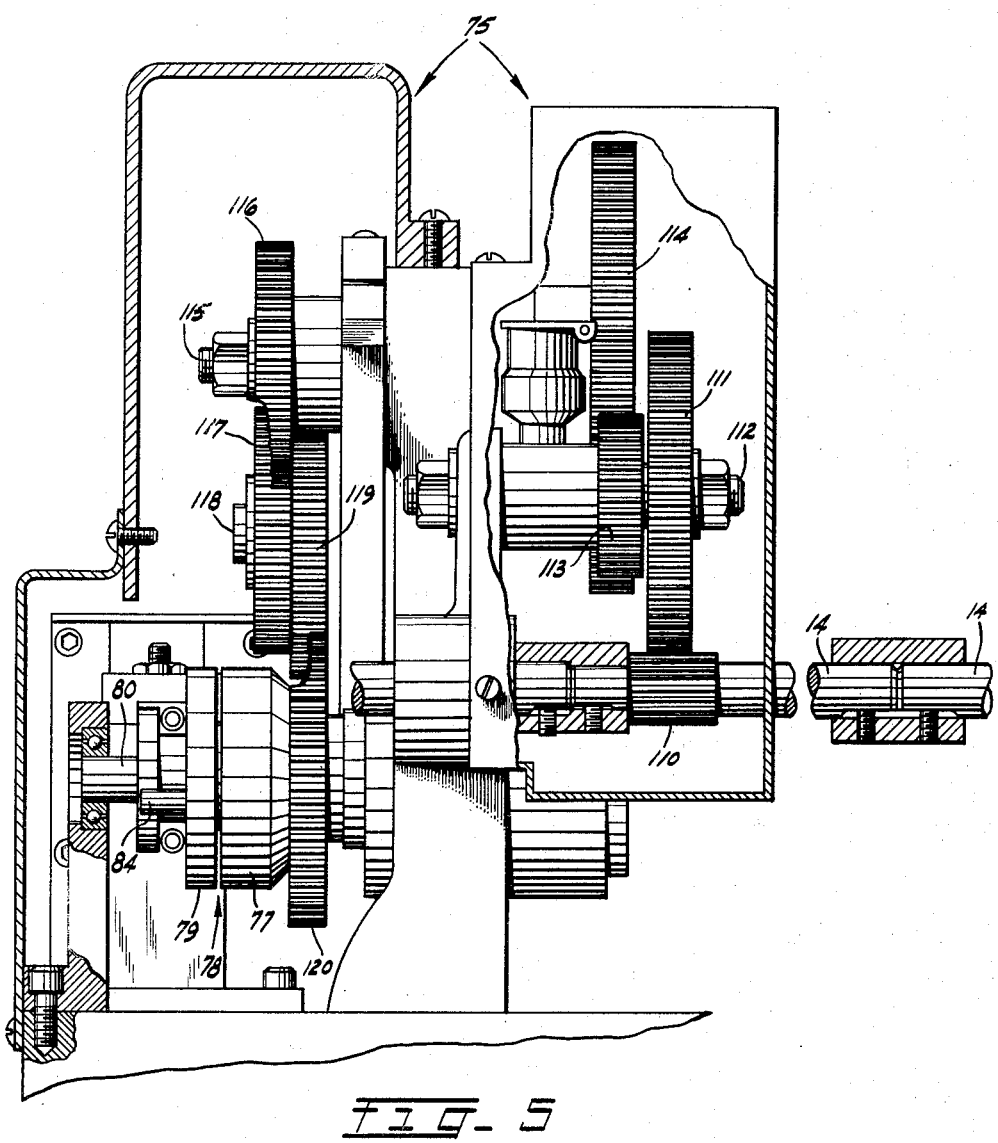

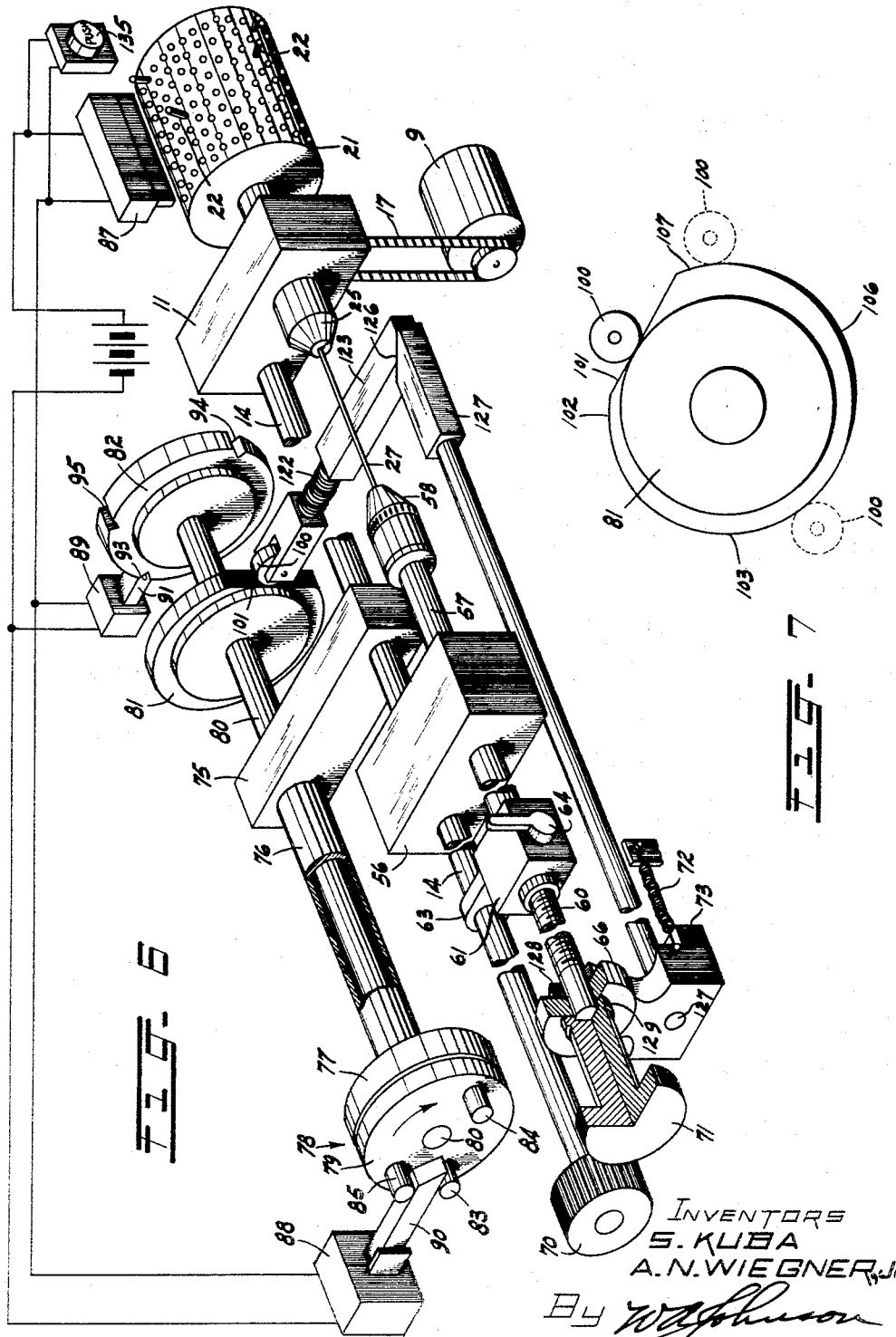

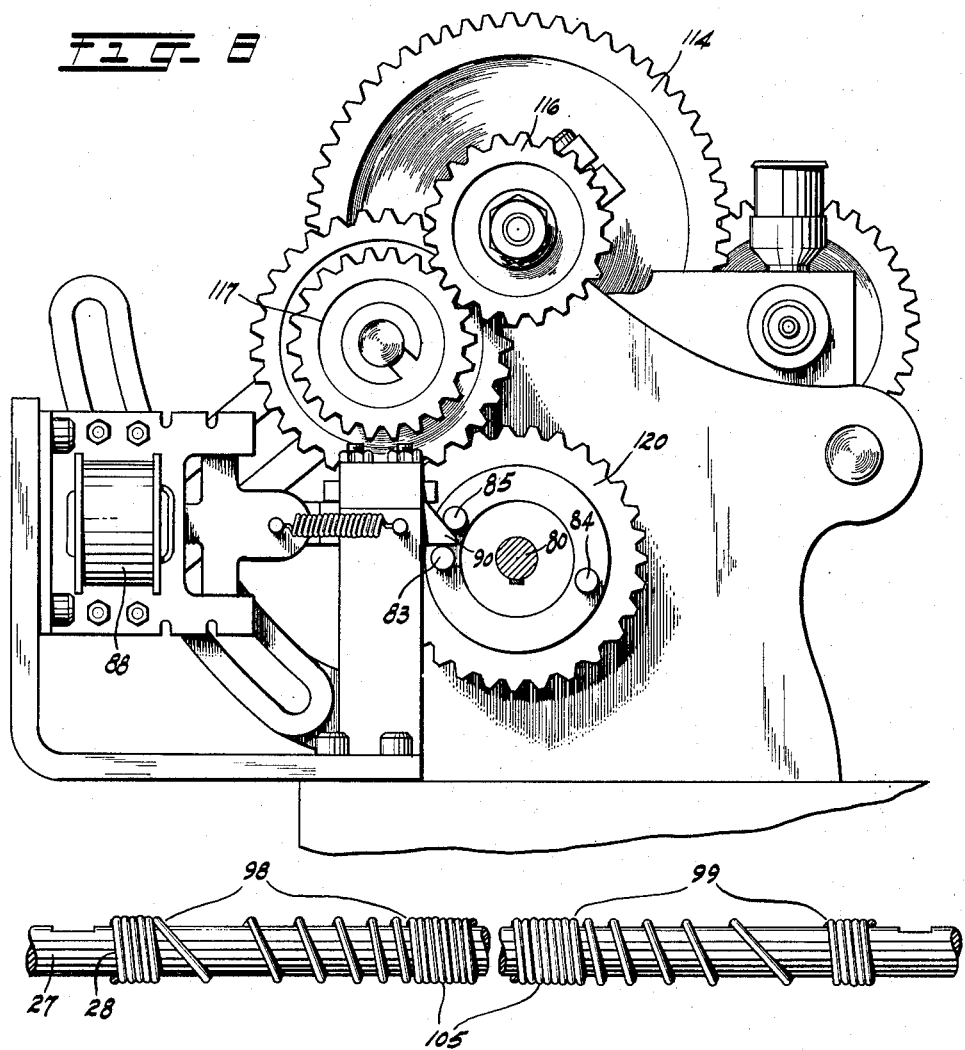

2,959,367
MODIFIED GRID WINDING LATHE

Samuel Kuba, Allentown, and Andrew N. Wiegner, Jr., Bethlehem, Pa., assignors to Western Electric Company, Incorporated, New York, N.Y., a corporation of New York Filed Aug. 22, 1957, Ser. No. 679,733

5 Claims. (Cl. 242—9)

This invention relates to winding lathes particularly lathes for winding wire helices such as those forming components of many electron tubes.

Lathes of this type are commonly used in making electron tube grids which usually have a plurality of turns of wire of a definite fixed pitch. For certain applications, such as travelling wave tubes, however, helices are required in which certain definite turns have a pitch different from the pitch of the other turns.

An object of the present invention is a winding lathe in which the pitch of a helix being wound may be changed as desired at any selected position in the winding.

In the present embodiment of the invention, according to the object, a wire winding lathe capable of winding a wire with a fixed pitch on a mandrel, through the action of a lead screw, is provided with means operable to move the lead screw longitudinally to form a predetermined variable pitch in a given number of the turns of wire on the mandrel.

Other objects and advantages will be apparent, from the following detailed description when taken in conjunction with the accompanying drawings wherein:

Figs. 1, 2 and 3, when placed in alignment with each other in their respective order, illustrate a top plan view of the wire winding lathe, portions being shown in the section;

Fig. 4 is an enlarged front elevational view of the wire clamp taken along the line 4—4 of Fig. 3;

Fig. 5 is an enlarged vertical sectional view taken along the line 5—5 of Fig. 2;

Fig. 6 is an isometric schematic view of the lathe;

Fig. 7 is a side elevational view of the feeding cam;

Fig. 8 is an enlarged vertical sectional view taken along the line 8—8 of Fig. 2;

Fig. 9 is an enlarged fragmentary view of the completed article, and

Fig. 10 is a fragmentary modification of a portion of the cam operating means shown in Fig. 2.

Beginning with Fig. 3 the lathe includes a main frame 10 supporting a housing 11 including suitable bearings for a drive shaft 12 and a driven shaft 14. A sprocket 15 and a hand wheel 16 fixedly mounted on the shaft 12 are driven by a chain 17 connected to a suitable power means such as an electric motor 9 (Fig. 6) with a conventional speed reducing unit not shown. The shaft 12 is connected through a coupling 18 to an input shaft 19 of the drive means 20 for the commercially known counter unit 21. The driving means used in the unit 20 will drive the drum-like unit 21 at a predetermined speed so that pins 22 placed selectively in any of the multiplicity of apertures 23 will function to control certain portions of the lathe.

A head stock 25 is connected to the shaft 12 and is longitudinally apertured at 26 to receive a mandrel 27. The shaft 12 is hollow to permit a mandrel of any desired length to be disposed therein during winding of wire 28 on the mandrel. The wire 28 is stored initially on a supply reel 29 mounted fixedly on a shaft 30 of a motor 31, the motor being supported by a bracket 32 which is mounted on the frame 10. The motor 31 is a low-inertia type motor with suitable gear reduction for torque multiplication to create a desired tension in the wire 28 as it is being wound on the mandrel 27. If desired, the tension created in the wire may equal 80% of the tensile strength of the wire but it has been found that satisfactory helix may be formed on the mandrel by establishment of tension equalling 20% of the tensile strength of the wire. Initially, the wire 28 is fed to the mandrel through a unit 33, the lay of the wire on the mandrel being controlled by a guide 34. The unit 33 includes a bracket 36 adjustable yet fixedly mounted at 37 on the frame 10 and carrying a post 38 on which a head 39 is adjustably mounted through the aid of a screw 40. A thumb screw 41 threadedly disposed in an aperture of the head 39 supports a rotatable member 42 movable relative to a jaw 43 of the head to releasably clamp the wire 28. This unit is employed between the operating cycles of the lathes to hold the leading end of the wire 28 in readiness for attachment to the mandrel 27. The guide 34 has a carbide tip 44 for engagement of the wire 28 and to lay adjacent the mandrel 27 to control the lay or pitch of the wire on the mandrel as it leaves the end of the head stock 25. The guide 34 is supported for movement in any of four directions as illustrated in Fig. 3. The guide with its offset portion 46 and the elongated aperture 47, is adapted, through the aid of a hand screw 48, to secure the guide after longitudinal adjustment to an arm 49. The arm 49 is supported for slide movement on parallel bars 50 and is secured in any desired adjusted position by hand screws 51 to vary the position of the guide 34 laterally relative to the head stock 25.

Returning to the shafts 12 and 14 in Fig. 3, it will be noted that these shafts are operatively connected to each other by gears 53 and 54 to continually drive the shaft 14 at the same speed the head stock is driven. The shaft 14 continues through Fig. 2 and most of the way through Fig. 1. In Fig. 2 shaft 14, in passing through a housing 56, is provided with a similar connection with a hollow shaft-like draw bar 57 that is provided by gears 53 and 54 (Fig. 3) so that the draw bar 57 will rotate in the same direction and at the same speed as shaft 12 and head stock 25. The draw bar 57 has a key-way 57' for driving connection with its gear in housing 56. A tool operated chuck 58 is mounted on the end of the draw bar 57 so that the mandrel 27 has one end firmly mounted in the chuck.

The draw bar 57 is hollow or tubular to receive a feed screw 60. A unit 61 held against rotation by a bushing 62 freely mounted on the shaft 14 and carried by an arm 63 of the unit, includes a roller bearing support (not shown) for its connection with the adjacent end of the draw bar 57. The unit 61 also includes the conventional half nuts for connection with the threaded shaft 60. A hand lever 64 is actuable to open the threaded nut to disconnect the unit 61 from the feed screw. When the hand lever 64 is in the position shown in Figs. 1 and 6, conventional springs in back of the half nuts will hold them in engagement with the threaded shaft. The left end of the threaded shaft 60 extends through a yoke 66 and is operatively connected to the extreme left end of the shaft 14 by suitable gears disposed in a housing 67. The gears in the housing 67 are such that, through the constant speed of rotation of the shaft 14, driving the draw bar 57 with the chuck 58 in the same direction and at the same speed of rotation as the head stock 25, the feed screw 60 will be rotated at a speed and in a direction relative to the unit 61 to cause movement of the draw bar away from the head stock at a known speed to produce winding of the wire 28 at a predetermined fixed pitch on the mandrel.

At this time, attention is directed to Fig. 6 wherein the apparatus is illustrated schematically. In this figure, the shaft 14 is shown connected to the threaded shaft 60 by two gears 70 and 71 whereas in reality a train of gears may be employed to bring about the desired speed of rotation of the threaded shaft to produce the desired pitch in the wire wound on the mandrel. Normally, the yoke 66 through the aid of a suitable spring such as is shown at 72, is held in a fixed position, as against a stop 73, to hold the feed screw normally against longitudinal or axial movement. However, through additional means, variations may be introduced into certain sections of the winding. This is brought about by a train of gears indicated generally at 75, Fig. 6, extending from a shaft 14 to a hollow shaft 76 which drives continuously a portion 77 of a clutch indicated generally at 78. The other portion 79 of the clutch is connected to a cam shaft 80 which extends through the hollow shaft 76, and through a cam 81 and a locking wheel 82 which are fixedly mounted at spaced positions thereon. The portion 79 of the clutch 78 has pins 83, 84 and 85 mounted thereon the pins being spaced from each other whereby the clutch may be released for connecting shafts 76 and 80 to drive the cam 81 predetermined portions of a cycle during spaced intervals controlled by the counter unit 21. The pins 22 of the counter unit are positioned to engage and actuate a switch 87 to complete a circuit to momentarily energize solenoids 88 and 89. The solenoid 88 has a spring pressed plunger type latch or bar 90 positioned normally in the path of the pins but moved out of engagement with any of the pins when the solenoid 88 is energized. The solenoid 89 has a similar spring pressed latch or core member 91 with an outer end formed V-shaped in cross section to interengage V-shaped notches 93, 94 and 95 to stop rotation of the cam shaft 80 at definite positions to control the turns or area in each winding where variable pitches are formed. In the present illustration two sections of varied pitches are formed in the winding. These sections, indicated at 98 and 99 in Fig. 9, are under the control of the cam 81 and the contour of its periphery in causing added longitudinal motions of the feed screw 60. The cam follower 100, when the lathe is in its starting position engages the flat or low portion 101 of the cam. When leaving the low portion during the first driving motion of the cam 81 the cam follower 100 is moved laterally by a quick rising portion 102 which merges into a gradual or continued rising portion 103 to produce the quick or rapid spacing of the first turn of the area 98 Fig. 9 and gradual diminishing spacing of the next five turns to the fixed pitch area 105. During the next operation of the clutch 78 the cam 81 will rotate a portion of the turn to cause a follower 100 to move gradually outwardly on the gradual rise 106 to the rapid rise portion 107 to produce the variations in the pitch of the wire as shown in the section 99 of Fig. 9.

Referring now to Figs. 2, 5 and 6 it will be noticed that the structure represented in Fig. 6 by the box-like formation 75 is illustrated in Figs. 2 and 5 as a train of gears extending from shaft 14 to the portion 77 of the clutch 78. This train of gears includes a pinion 110 mounted on the shaft 14 and interengaging a gear 111 mounted on a spindle 112. A smaller gear 113 mounted on the spindle 112 and rotating with the gear 111 interengages a larger gear 114. The gear 114 is mounted on one end of a shaft 115 while a smaller gear 116 is mounted upon another end thereof. The gear 116 interengages a gear 117 which is mounted upon a spindle 118 with a larger gear 119 and rotates therewith. The gear 119 interengages a gear 120 which is mounted on the hollow shaft 76 with the clutch member 77. Through this train of gears the hollow shaft 76 together with the clutch member 77 is driven continuously at a ratio of 1 to 15 the speed of the shaft 14 and the mandrel 27. As a result, this continuously operating driving means may be connected to the cam shaft 80 through the clutch 78 following energization of the solenoids 88 and 89 momentarily. The releasing actions of the solenoids unlatch the wheel 82 and free the clutch 78 to engage and rotate the cam shaft 80 during rotation of the clutch member 79 from pin 83 to pin 84, that is, until the pin 84, Fig. 6, is moved into engagement with the solenoid latch 90. During this action the cam 81 will have moved 144°. This fractional movement of the cam 81 occurs during the winding of six turns of the wire 28 on the mandrel 27. The same action takes place regarding the driving means for the cam 81 during the next releasing operation to free the solenoid latch 90 from pin 84 for engaging the clutch and disengaging the clutch by pin 85 engaging the latch 90. During the present illustration, the cam driving means is rendered effective twice to cause predetermined partial turns of the cam 81 to produce the varied pitch sections 98 and 99 as shown in Fig. 9. This variation in the pitch of the wire on the mandrel originates in the formation of the high portions of the cam 81 and is translated through the follower 100, the feed screw 60 and the draw bar 57 to the mandrel 27. The follower 100 is normally urged against the cam by a spring 122 and has a portion 123 slidable in a guideway 124 and provided with a roller 125 adjacent the end farthest from the cam to engage a diagonal surface 126 of a push rod 127 which is supported for sliding movement longitudinally. In the schematic illustration of the apparatus in Fig. 6 the opposite end of the push rod 127 is fixed to a yoke 66 through which the feed screw 60 extends. In the present illustration the threads of the feed screw 60 terminate short of a collar 128 fixed to the shaft to cooperate with a similar collar 129, which in the present illustration is fixed to gear 71, to permit movement of the yoke 66, through action of the push rod 127, to impart axial movement to the feed screw and through the draw bar 57 to the mandrel 27.

In the present illustration the turns of the wire 28 on the mandrel 27 are closely positioned with the exception in the areas where the pitch is varied by the action of the mechanism for causing additional longitudinal movement of the mandrel during predetermined intervals to produce the varied pitches as shown at 98 and 99 in Fig. 9. This may be called the process of adding to the fixed pitch of the wire. If desired the reverse action may be accomplished, assuming that the fixed pitch of the turns of wire on the mandrel is such that turns are spaced initially further apart and it is desirable, during certain intervals to bring the turns closer together at varied pitches. This may be accomplished by the same mechanism, creating a variation only in the direction of movement of the feed screw to subtract from the initial feeding motion rather than add to it as previously described. This variation in structure and operation is illustrated in Fig. 10 wherein the portion of the follower 123 in its guideway 124 may have its roller 130 positioned to engage a diagonal surface 131 of an extended portion of a draw bar 132 to move it, during periods of action by the high portions of the cam 81, from the dotted line position to the solid line position to bring about varied pitches in the wire on the mandrel determined by the preselected contour of the high portions of the cam 81.

Considering now the operation of the wire winding lathe, let it be assumed that the lathe is in the starting position, the mandrel secured in the chuck 58 and positioned in the head stock 25 with the chuck in its starting position adjacent the guide 34. With the guide 34 located to assist in producing the desired fixed pitch in each turn of the wire wound on the mandrel and the leading end of the wire secured to the mandrel or to the chuck 58, the lathe may be set in operation by energizing the motor 9. Immediately upon energizing the motor 9 the mandrel 27 will be driven to wind ten turns of the wire thereon. The unit 21 through the selected position of the pins 22 will, at the completion of ten turns, cause one of the pins 22 to actuate the switch 87 (Fig. 6) to energize solenoids 88 and 89 respectively, releasing the latch members 90 and 91 for engagement of the clutch 78 and unlocking the wheel 82 to permit the clutch to remain engaged for 144° of one turn of the cam shaft. This fractional turn of the cam shaft will be terminated by the pin 84 of the clutch engaging the stop bar 90 while the latch 91 of solenoid 89 entering the groove 94 of the wheel 82 will position the cam shaft accurately to cause the variations in the pitch of the six selected turns of the wire on the mandrel, through section 98, Fig. 9, to terminate and the fixed pitch winding of the turns to continue. The mandrel continues rotating at a constant pitch of 100 turns per minute for 504 turns. The number of turns are controlled by the unit 21 and during the next six turns beginning accurately at a given section and at a given turn in the wire on the mandrel, the solenoids 88 and 89 will be energized again by another pin 22 of the unit 21 closing the switch 87. This action repeats identically, turning of the shaft 80 with the cam 81 through 144° but the difference in the high portion 106—107 over the high portion 102—103, during this period, will cause a change from small or minimum pitch variations increasing to a large or maximum pitch variations and occurring within the six turns. After this action feed screw 60 will continue to move the mandrel for a predetermined number of turns (10) at the fixed pitch.

It should be understood that through this mechanism the variations in the pitch of the wire may differ as desired by varying the contours of the active portions cam 81, and/or by varying the direction of movement of the feed screw to add to or subtract to its normal feeding motion to bring about numerous variations in the pitch of any number of turns of the wire.

After the winding operation has been completed the thumb screw 41, Figs. 3 and 4, may be actuated to clamp the wire 28 to hold the leading end of the wire for the next mandrel after it has been severed from the present mandrel. The half nut structure 61 may be disengaged from the feed screw 60 through actuation of the lever 64, at which time the draw bar 57 may be moved to the left to free the mandrel 27 from the head stock 25, after which the mandrel may be freed from the chuck 57 and a new mandrel inserted in place in the head stock and the chuck for the next winding operation. Due to the fact that only selected portions of a complete turn of the cam shaft 80 is employed, a push button 135, Fig. 6, is employed to close the circuits to the solenoids 88 and 89 to remove their latches 90 and 91 to permit manual actuation of the lathe through rotation of the hand wheel 16 until the latch 91 enters the groove 93 of the wheel 92 and the stop latch 90 is engaged by the pin 83. This returns the cam 81 so that low portion 101 engages the follower 100 and the push rod 127 is at its foremost position to the right. The leading end of the wire 28 may be released from the unit 33 and connected to the mandrel or to the chuck 58. At this time, with the chuck in its foremost position to the right, and the guide 34 located through its varied adjustments relative to the head stock 25, the lathe may repeat the winding operation to produce the wound structure with the selected constant pitch in chosen numbers of the turns and the introduction of predetermined varied pitches in selected numbers of turns.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a wire winding lathe where a chuck mounted on one end of a draw bar grips a leading end of a mandrel, rotates the mandrel about an axis to wind turns of a wire, received from a fixed position wire guide, on the mandrel and is moved axially away from the wire guide to move the mandrel longitudinally relative to the wire guide at a predetermined constant speed by a nut mounted on the draw bar and moved by a driven feed screw to cause the turns of wire on the mandrel to be wound at a predetermined pitch; a rod disposed adjacent the feed screw, means to support the rod for movement from a normal position, a connector interposed between the rod and the feed screw so that movement of the rod will cause the connector to move the feed screw axially, a rotatable cam shaft, a cam mounted thereon and having a low portion and a high portion, a cam follower having portions respectively normally engaging the low portion of the cam and the rod, continuously operable drive means, a normally disengaged clutch interposed between the drive means and the cam shaft and having a projection thereon, an energizable unit normally engaging the projection and thereby holding the clutch disengaged, a normally open switch in a circuit including the unit, and a timer driven with the chuck and mandrel to close the switch after a predetermined number of turns have been wound on the mandrel to energize the unit to release the clutch for engagement of the cam shaft with the drive means to cause the high portion of the cam to move the follower to move the rod to move the feed screw so that the draw bar and the mandrel will be moved longitudinally to cause forming of known variable pitches in a given number of turns of the wire on the mandrel.

2. A wire winding lathe according to claim 1 in which a locating element is mounted on the cam shaft, rotatable therewith and has a latch engaging portion, and an energizable latch normally engaging the portion of the locating element to hold the low portion of the cam in engagement with its portion of the cam follower, the latch being disposed in said circuit with the unit and energized to unlatch the element when the switch is closed.

3. A wire winding lathe according to claim 2 in which the locating element has another latch engaging portion, and another projection on the clutch cooperating with the unit after a fragmentary cycle of the cam shaft to disengage the clutch and locate the other latch engaging portion of the locating element in registration with the latch to stop the cam shaft at a given position to limit variations in the pitch of the wire on the mandrel to the predetermined turns.

4. In a wire winding lathe where a chuck mounted on one end of a draw bar grips a leading end of a mandrel, rotates the mandrel about an axis to wind turns of a wire, received from a fixed position wire guide, on the mandrel and is moved axially away from the wire guide to move the mandrel longitudinally relative to the wire guide at a predetermined constant rate of speed by a nut mounted on the draw bar and moved by a driven screw to cause the turns of wire on the mandrel to be wound at a predetermined pitch; a rod disposed adjacent the feed screw, means to support the rod for movement from a normal position, a connector interposed between the rod and the feed screw so that movement of the rod will cause the connector to move the feed screw axially, a rotatable cam shaft, a cam mounted thereon and having a low portion and successive progressively higher high portions occupying fragmentary circumferential portions of given lengths about the periphery of the cam, a cam follower having portions respectively normally engaging the low portion of the cam and the rod, continuously operable drive means for the cam shaft, a normally disengaged clutch interposed between the drive means and the cam shaft, projections fixed to the clutch at spaced positions about the axis thereof and corresponding in position to the low portion and the ends of the successive high portions on the cam, an energizable unit mounted for engagement with the projections, when de-energized, normally engaging the projection corresponding to the low portion of the cam, to hold the clutch disengaged, a normally open switch in a circuit including the unit, and a timer driven with the head to close the switch at different intervals after predetermined numbers of turns have been wound on the mandrel to energize the unit to release the projections successively for fragmentary cycles of the clutch for movement of the successive high portions of the cam relative to the follower to cause the draw bar to move the mandrel longitudinally at different intervals to form known variable pitches in given numbers of groups of turns on the mandrel.

5. A wire winding lathe according to claim 4 in which a locating element is mounted on the cam shaft, rotatable therewith and having latch engaging portions corresponding to the low portion and the ends of the successive high portions of the cam, and an energizable latch normally engaging the portion of the element corresponding to the low cam portion, the latch being disposed in the circuit with the unit and energized to unlatch the element each time the switch is closed.

References Cited in the file of this patent

UNITED STATES PATENTS

| | | |
|---|---|---|
| 212,424 | Ball | Feb. 18, 1879 |
| 1,970,599 | Franke | Aug. 21, 1934 |
| 2,426,522 | Porter | Aug. 26, 1947 |